H. S. SHAFER.
AUTOMOBILE TIRE.
APPLICATION FILED MAY 27, 1909.
960,119.
Patented May 31, 1910.
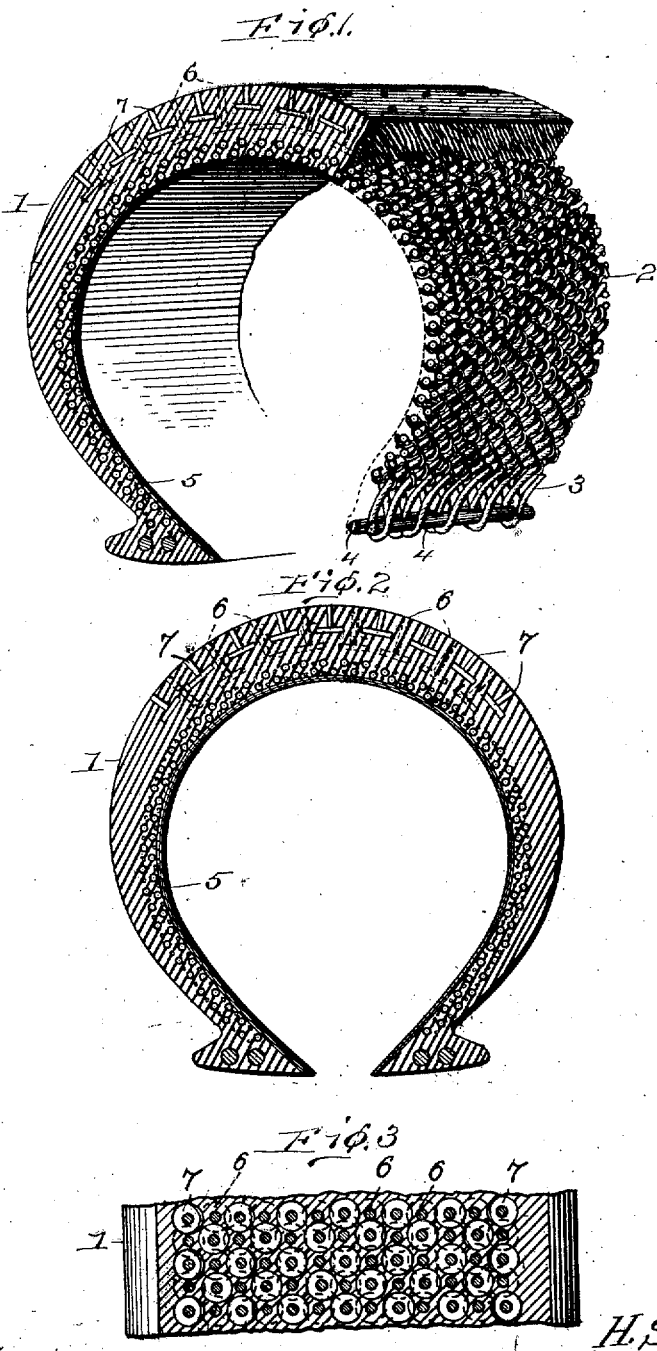

UNITED STATES PATENT OFFICE.

HOWARD S. SHAFER, OF NAZARETH, PENNSYLVANIA.

AUTOMOBILE-TIRE.

960,119.  Specification of Letters Patent.  Patented May 31, 1910.

Application filed May 27, 1909. Serial No. 498,668.

*To all whom it may concern:*

Be it known that I, HOWARD S. SHAFER, a citizen of the United States, residing at Nazareth, in the county of Northampton and State of Pennsylvania, have invented certain new and useful Improvements in Automobile-Tires; and I do declare the following to be a full, clear, and exact description of the invention, such as will enable others skilled in the art to which it appertains to make and use the same.

This invention relates to improvements in automobile tires.

The object of the invention is to provide an improved construction of tire having means arranged therein to prevent skidding or slipping of the tire and also to prevent the puncturing of the same.

With the foregoing and other objects in view, the invention consists of certain novel features of construction, combination and arrangement of parts, as will be more fully described and particularly pointed out in the appended claim.

In the accompanying drawings, Figure 1 is a perspective view of a section of tire constructed in accordance with the invention; parts of the same being broken away; Fig. 2 is a transverse sectional view of the same; Fig. 3 is a transverse or horizontal sectional view through the outer portion of the tire, showing the arrangement of the anti-skidding rivets whereby they serve to prevent puncturing the tire.

My improved tire comprises a body portion 1 formed of rubber or other suitable composition and has molded or embedded therein adjacent to its inner surface an armor 2 formed of woven wire, through the loops or coils of which are diagonally arranged wires 3, which extend to the inner edges of the tire and are looped around fastening rods or wires 4 arranged in the edges of the tire, as shown. The edges of the tire may be of any suitable shape to engage the style of rims on which the tire is to be placed. The tire is preferably provided with a lining 5 formed of several layers of canvas or other suitable fabric.

In the tread portion of the tire is arranged a series of anti-skidding or slipping rivets 6 and 7, said rivets being molded or vulcanized in the tire when the latter is formed. The rivets 6 are of greater length than the rivets 7, the heads of the rivets 6 being disposed in a plane immediately below the heads of the rivets 7 and the heads of the rivets 7 are so arranged as to practically cover the spaces between the heads of the rivets 6, thereby forming an outer armor for the tread portion of the tire which will prevent the puncturing of the same by any sharp objects over which the same may pass. The outer ends of the rivets 6 and 7 extend through the tread portion of the tire and are flush with the outer surface thereof and serve to prevent the lateral skidding or slipping of the tire. It will thus be seen that the rivets 6 and 7 serve the two-fold purpose of providing an armor for the tire as well as providing means to prevent the skidding or slipping of the same.

From the foregoing description, taken in connection with the foregoing description, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

A tire provided with anti-skidding and puncture-proof means comprising a series of rivets molded in the tread portion of the tire with their heads disposed beneath the outer surface thereof and their stems extending flush with the outer surface, and other series of longer rivets arranged in the tread portion of the tire with their heads disposed beneath and alternating with those of the first-mentioned rivets and their stems extending flush with the outer surface of the tread portion.

In testimony whereof I have hereunto set my hand in presence of two subscribing witnesses.

HOWARD S. SHAFER.

Witnesses:
 GRANVILLE J. BECK,
 WILSON E. BECK.